United States Patent
Coccia et al.

(10) Patent No.: US 8,356,551 B2
(45) Date of Patent: *Jan. 22, 2013

(54) APPARATUS AND METHOD FOR PREPARING MILK UNDER VARIOUS TEMPERATURE AND CONSISTENCY CONDITIONS IN A COFFEE MACHINE FOR FORMING VARIOUS TYPES OF BEVERAGES

(75) Inventors: Andrea Coccia, Binasco (IT); Dario Sala, Binasco (IT)

(73) Assignee: Gruppo Cimbali S.p.A., Binasco MI (IT)

( * ) Notice: Subject to any disclaimer, the term of this patent is extended or adjusted under 35 U.S.C. 154(b) by 604 days.

This patent is subject to a terminal disclaimer.

(21) Appl. No.: 12/246,098

(22) Filed: Oct. 6, 2008

(65) Prior Publication Data
US 2009/0092728 A1 Apr. 9, 2009

(30) Foreign Application Priority Data
Oct. 8, 2007 (EP) .................................... 07425627

(51) Int. Cl.
*A47J 31/44* (2006.01)
*A23F 3/00* (2006.01)
*A23N 5/00* (2006.01)

(52) U.S. Cl. ............ 99/293; 99/290; 99/323.1; 426/569
(58) Field of Classification Search ..................... 99/293, 99/294, 281, 288, 452; 426/520, 569, 595
See application file for complete search history.

(56) References Cited

U.S. PATENT DOCUMENTS
5,207,148 A * 5/1993 Anderson et al. ............... 99/281
6,006,654 A * 12/1999 Pugh ............................... 99/293
(Continued)

FOREIGN PATENT DOCUMENTS
DE 4445436 6/1996
(Continued)

*Primary Examiner* — Humera Sheikh
*Assistant Examiner* — Subbalakshmi Prakash
(74) *Attorney, Agent, or Firm* — Kyle M. Zeller; King & Spalding

(57) ABSTRACT

Apparatus for preparing and dispensing hot or cold milk, in the frothed or non-frothed state, in a coffee machine for preparing various types of beverages based on coffee with milk, said coffee machine comprising a coffee apparatus for producing coffee with an associated coffee dispensing device, a first water heater for producing steam, a second water heater for producing hot water for preparation of the coffee in said coffee apparatus, said first and second heaters being connected to a water source for replenishing them with water, a frothing device provided with an internal chamber for frothing the milk when required and at least one nozzle for dispensing the milk externally, said apparatus comprising a milk line for the milk, connecting a source of liquid milk to the frothing device, a steam line for the steam, connecting the first water heater to the frothing device, as well as an air line for the air, connecting a source of air to the said frothing device, a pump arranged along the milk line for supplying the milk from said source of liquid milk to said frothing device, a first intercept valve arranged along the steam line and a second intercept valve arranged along the air line, wherein said pump arranged along the milk line and said first and second intercept valves are able to be operated independently of each other such that the milk line, the steam line and the air line are connected to said chamber of the frothing device one at a time or in combination with each other.

2 Claims, 3 Drawing Sheets

U.S. PATENT DOCUMENTS 8,056,469 B2 * 11/2011 Sala et al. .................. 99/290
2005/0118319 A1 * 6/2005 Green et al. ............... 426/564

FOREIGN PATENT DOCUMENTS

| EP | 0 472 272 | 2/1992 |
| EP | 0997093 | 5/2000 |
| EP | 1 374 748 | 1/2004 |
| EP | 1747743 | 1/2007 |
| EP | 1785074 | 5/2007 |
| WO | WO 01/88187 | 11/2001 |
| WO | WO 2005/063093 | 7/2005 |
| WO | WO 2005063093 A1 * | 7/2005 |

* cited by examiner

APPARATUS AND METHOD FOR PREPARING MILK UNDER VARIOUS TEMPERATURE AND CONSISTENCY CONDITIONS IN A COFFEE MACHINE FOR FORMING VARIOUS TYPES OF BEVERAGES

FIELD OF THE INVENTION

The present invention relates to an apparatus for preparing milk under various temperature and consistency conditions in a coffee machine for preparing various types of beverages.

The invention also relates to a method for preparing hot milk in the liquid or frothed state.

BACKGROUND OF THE INVENTION

Apparatus of the type mentioned above are known both in the sector of automatic beverage dispensing machines and in the sector of automatic machines used professionally in bars.

The various types of beverages which may be dispensed, as is known, comprise mainly cappuccino where an amount of—usually hot—foamed or frothed milk is added to the coffee, but also coffee with the addition of a small amount of hot or cold milk which is not frothed.

In the machines of the type mentioned above there therefore exists the need to have access to milk at various temperatures, ranging from cold to hot, and with a varying type of consistency, i.e. in ordinary liquid form or else foamed or frothed.

As regards the milk to be used in these types of machines and apparatus, as an alternative to fresh milk or long-life milk, the use of diluted concentrated milk has become more established recently, in particular in connection with machines which are intended to operate automatically, for obvious reasons associated with the difficulty or complexity of replenishing and storing the milk.

An example of use of fluid concentrated milk in order to obtain liquid milk by means of dilution with water is described in US-A-2005/0118319.

An example of a coffee machine with a frothing device which uses fluid concentrated milk which is liquefied by means of dilution with water is described in EP-A-1 747 743.

In accordance with that described and illustrated in the document mentioned above, the concentrated milk is liquefied using hot water which is drawn from a water heater of the coffee machine or by means of cold water drawn from a conventional source outside the machine.

Heating of the liquid milk, in accordance with the contents of the prior document cited, is therefore performed during dilution of the concentrate, while frothing thereof, using pressurised air and steam, is performed in the frothing device to which the liquid milk is supplied by means of the suction effect caused by the steam combined with the air.

The apparatus described by EP-A-1 747 743 therefore envisages two heating locations: the first one, during mixing and dilution of the concentrate when it is required to prepare non-frothed hot milk, and the second one in the frothing device when it is required to supply frothed milk, for example, for preparation of a cappuccino, it not being possible in this second location to obtain solely hot milk owing to the combined effect of the steam with the pressurised air.

It is clear that the provision of two different locations for heating the milk in order to be able to provide the apparatus with all the necessary flexibility as regards the temperature and consistency conditions required for the milk constitutes a drawback because it requires a greater corresponding functional complexity of the machine; this, owing to the particular nature of these machines which must operate mainly without the presence of dedicated personnel, has a negative effect on their reliability over time.

SUMMARY OF THE INVENTION

The object of the present invention is to make the machines of the type specified above as reliable as possible and at the same time allow the machine to perform the operations necessary for formation of the milk with all its various different temperature and consistency characteristics so as to satisfy the needs of users as regards differentiation of beverages comprising coffee and milk.

According to an aspect, the present invention relates to an apparatus for preparing and dispensing hot or cold milk, in the frothed or non-frothed state, in a coffee machine comprising a coffee apparatus for producing coffee, a first water heater for producing steam, a second water heater for producing hot water for preparation of the coffee in said coffee apparatus, a frothing device provided with an internal chamber for frothing the milk when required and at least one nozzle for dispensing the milk externally, said apparatus comprising a milk line for the milk, connecting a source of liquid milk to the frothing device, a steam line for the steam, connecting the first water heater to the frothing device, as well as an air line for the air, connecting a source of air to the said frothing device, a pump arranged along the milk line for supplying the milk from said source of liquid milk to said frothing device, a first intercept valve arranged along the steam line and a second intercept valve arranged along the air line, wherein said pump arranged along the milk line and said first and second intercept valves are able to be operated independently of each other such that the milk line, the steam line and the air line are connected to said chamber of the frothing device one at a time or in combination with each other.

According to another aspect, the present invention relates to a method for heating milk comprising a frothing device provided with an internal chamber, the method comprising the steps of: diluting a predetermined amount of concentrated milk with a corresponding predetermined amount of cold water so as to obtain an amount of cold diluted milk; conveying the amount of cold diluted milk into the chamber of the frothing device; conveying an amount of steam to the chamber of the frothing device so as to heat the cold liquid milk and to obtain an amount of heated liquid milk, wherein the amount of steam is selected so as to reach a desired temperature in the amount of heated liquid milk, and wherein heating to the desired temperature is performed by transferring condensation heat of the amount of steam to the cold liquid milk

BRIEF DESCRIPTION OF THE DRAWINGS

The characteristic features and advantages of the present invention will emerge more clearly from the following detailed description of a few preferred practical embodiments thereof illustrated by way of a non-limiting example in the accompanying drawings in which.

DESCRIPTION OF THE PREFERRED EMBODIMENTS

Figure 1:
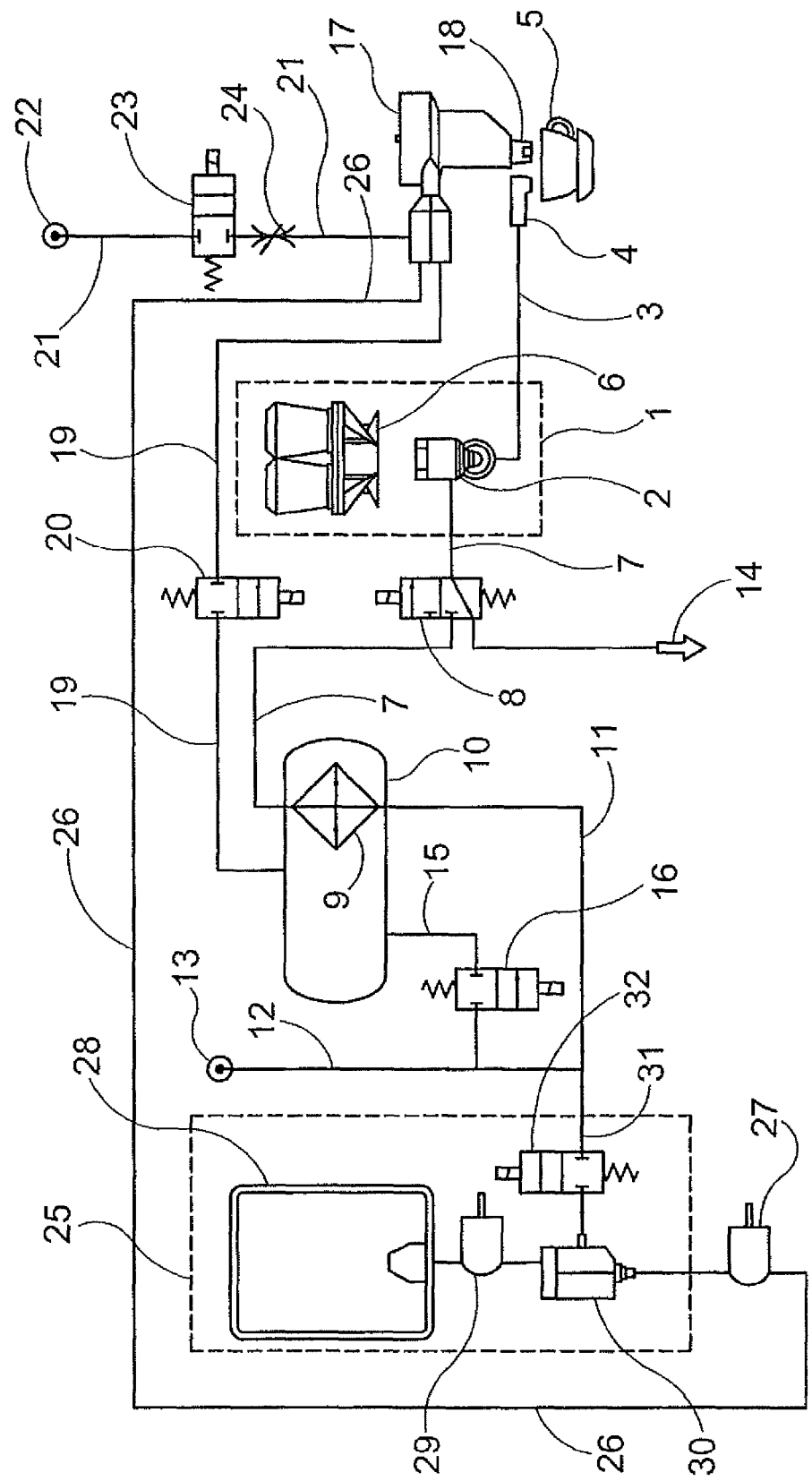
FIG. 1 shows in schematic form the general layout of the apparatus in accordance with a first embodiment thereof.

With reference to the abovementioned figures and in particular FIG. 1, 1 denotes in its entirety an apparatus for producing coffee, in particular espresso coffee, although other types of coffee drinks must not be regarded as excluded. 2 denotes the coffee extraction device which is connected, by means of a line 3, to a conventional dispensing device 4 underneath which a receiving cup schematically indicated by 5 is situated.

The characteristics of the coffee extraction device 2 depend on the preparation methods: it may be in the form of a simple mixer in the case of soluble coffee or in the form of a concentrated syrup.

Alternatively, it may consist of a conventional device with filter. 6 denotes schematically a conventional container for dispensing soluble coffee or concentrated coffee syrup or also represents the device for grinding coffee beans in the case of conventional espresso coffee.

The extraction device 2 is connected by means of the line 7 to an intercept valve 8 which connects it to the hot water source which, in the example shown in FIG. 1, consists of a heat exchanger 9 situated inside the boiler 10 which, in the machine, is also intended to produce steam. The heat exchanger 9 is connected, by means of the line 11 and the line 12, to a water source 13 for the necessary replenishing with water.

Figure 2:
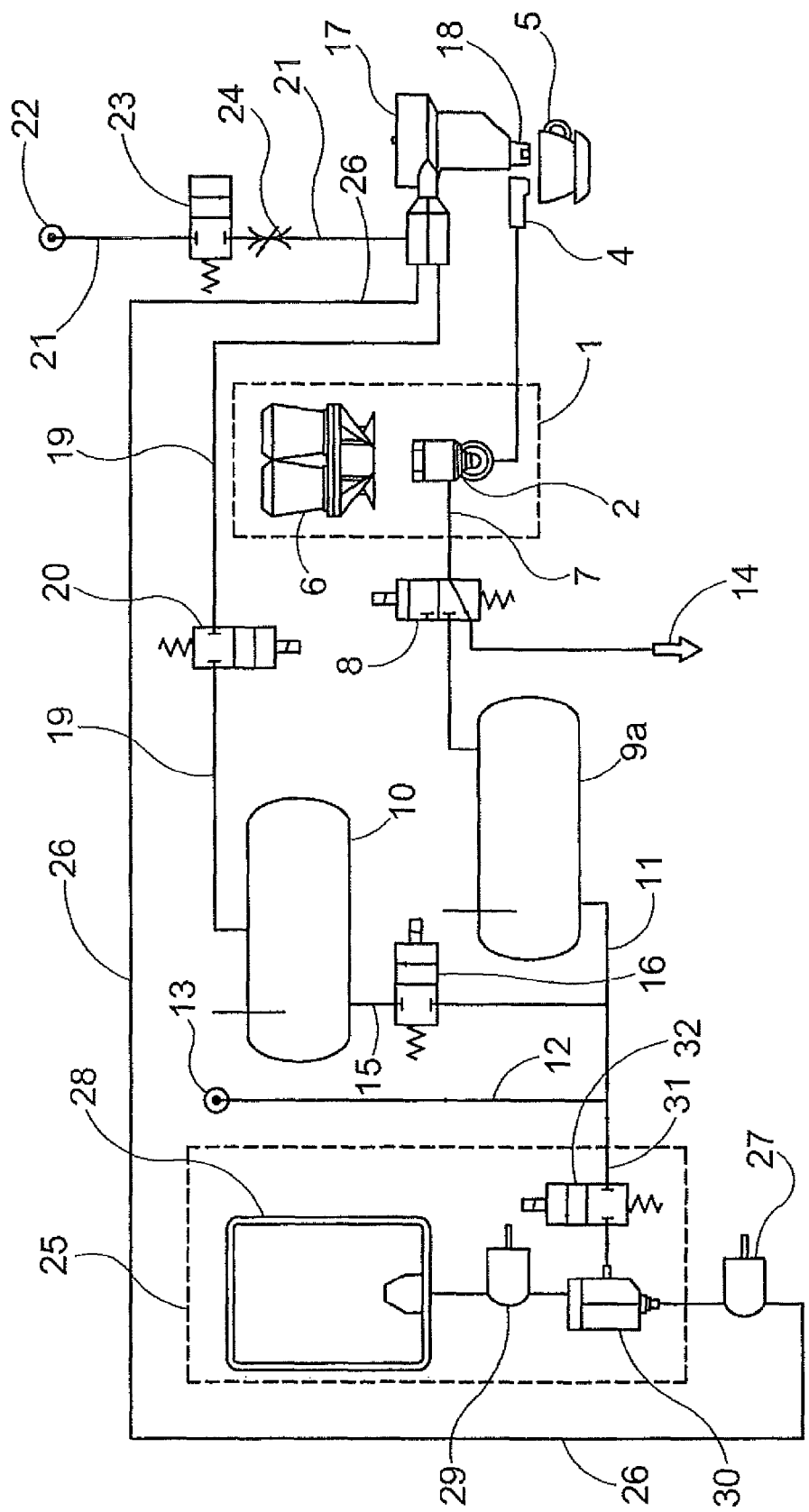
FIG. 2 shows the apparatus of FIG. 1 in accordance with a second embodiment thereof.

Alternatively, as can be seen from FIG. 2, the heat exchanger 9 may be replaced by a heater—denoted by 9a in FIG. 2—which is independent of the boiler 10 in order to provide the apparatus with a greater degree of flexibility when choosing the temperature to be imparted to the water which is intended to form the coffee in the apparatus 1.

In the position where it intercepts the line 7, the valve 8 connects the extraction device to the outlet indicated by 14 for removal of any residual matter.

The boiler 10 is also replenished with water from the source 13 via the line 15 and the intercept valve 16.

A milk frothing device, which is denoted overall by 17, with an associated dispensing nozzle 18 situated above the cup 5, is associated with the apparatus 1 for producing coffee.

The frothing device 17 is connected, by means of the line 19 and the intercept valve 20, to the steam-producing boiler 10. Via another line, indicated by 21, the frothing device 17 is connected to an air source indicated by 22.

An intercept valve 23 and an adjustable throttling device 24 are arranged along the line 21.

Finally, the said frothing device 17 is again connected to a source 25 of liquid milk by means of a line 26 along which a pump 27, operated by a conventional electric motor (not shown), is arranged. The pump 27 may be advantageously of the peristaltic or gear type and the electric motor may be of the variable-speed type.

The source 25 of liquid milk consists of a reservoir 28 of concentrated milk in the fluid state which is conveyed, by means of a metering pump 29, to a connector 30 which may also be designed to contain internally a non-return valve (not shown in the drawings) suitable for preventing bacterial contamination of the product contained in the reservoir 28.

The water source 13 is connected to the connector 30 by means of a line 31 intercepted by the valve 32.

Mixing of a predetermined quantity of concentrated milk and water from the source 13 is performed inside the connector 30, with the formation of cold diluted milk.

The latter, by means of the pump 27 and the line 26, is propelled as far as the frothing device 17 where heating is performed by means of transfer of the condensation heat of the steam supplied by the boiler 10 via the line 19 and the intercept valve 20.

Any frothing is performed by means of the introduction of air via the line 21 and the adjustable throttling device 24.

In the case where a quantity of cold milk is desired or requested by the user, the steam valve 20 is kept closed.

In these conditions the cold milk may be dispensed in its liquid state or may also be frothed, by supplying air to the device 17 via the line 21.

Figure 3:
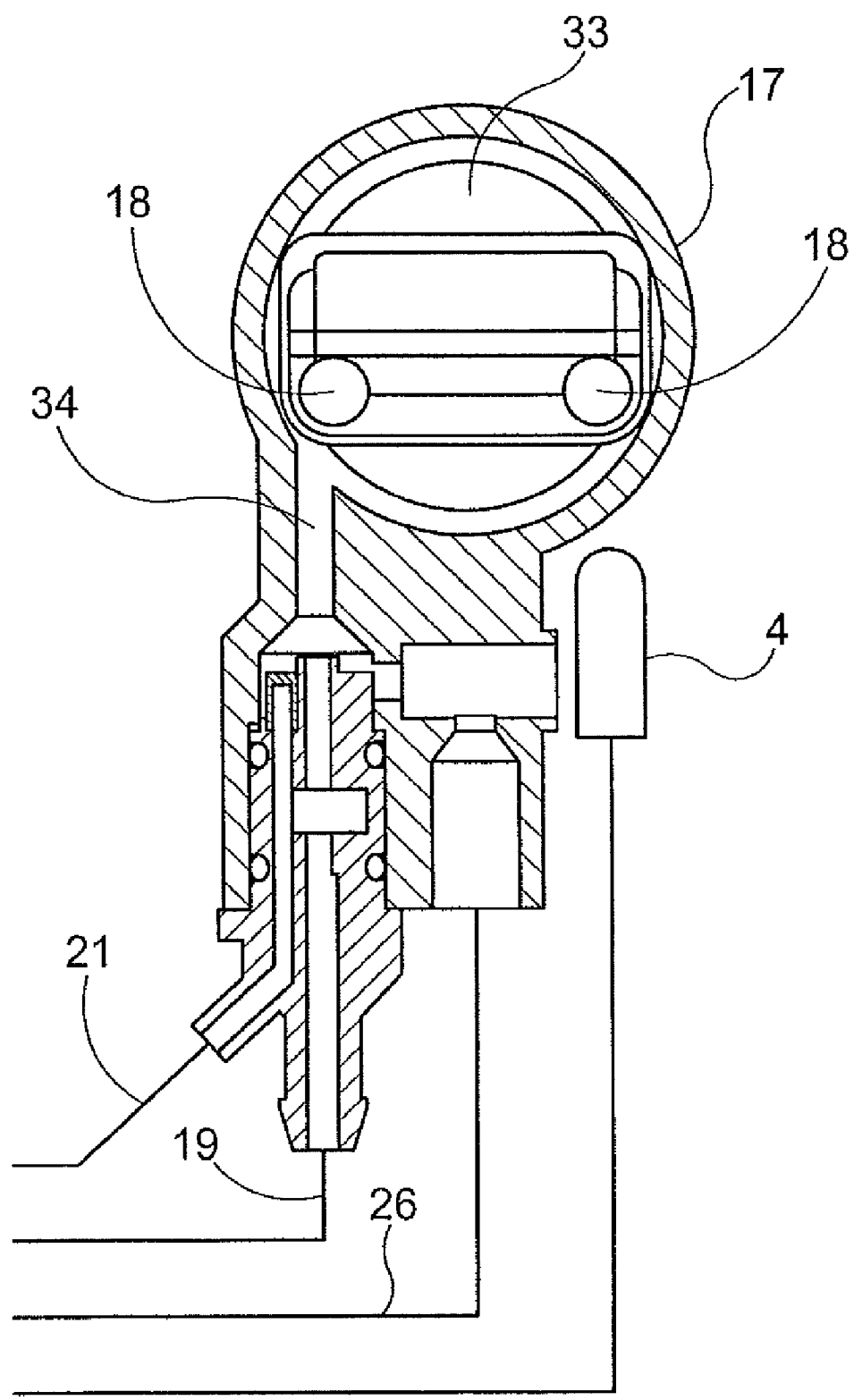
FIG. 3 shows, in section, on a larger scale, the frothing device of the apparatus according to FIGS. 1 and 2 with the associated lines for supplying the liquid milk, steam and pressurised air.

From the above description and with reference to FIG. 3 which shows a cross-section through the frothing device 17, it can be understood that the chamber 33 of this device, via the line 34, may be connected individually to any one of the steam, air and milk lines 19, 21, 26, respectively, depending on the opening state of the respective steam and air intercept valves 20 and 23 and operation of the milk pump 27.

It can therefore be understood that, with the apparatus according to the present invention, the frothing device 17 is able to supply cold or hot liquid milk or also hot or cold frothed milk at the desired temperature values which are achieved by means of transfer of solely the condensation heat of a predetermined amount of steam into a likewise predetermined amount of milk. All of this is performed within a single structural location of the machine and precisely in the frothing device 17 alone. With the apparatus according to the invention it is therefore possible to achieve the maximum flexibility in terms of the type of milk to be added to the coffee and at the same time provide the apparatus with a high degree of operating reliability.

The invention claimed is:

1. An apparatus for preparing and dispensing hot or cold milk in a frothed or non-frothed state in a coffee machine for preparing beverages based on coffee with milk, said coffee machine comprising a coffee apparatus for producing coffee with an associated coffee dispensing device, a first water heater for producing steam, a second water heater for producing hot water for preparation of the coffee in said coffee apparatus, said first and second heaters being connected to a water source for replenishing with water, and a frothing device provided with an internal chamber for frothing the milk when required and at least one nozzle for dispensing the milk externally, said apparatus comprising:

a milk line for the milk, connecting a source of liquid milk to the frothing device, a steam line for the steam, connecting the first water heater to the frothing device; an air line for air, connecting a source of air to said frothing device;

a pump arranged along the milk line for supplying the milk from said source of liquid milk to said frothing device; and a first intercept valve arranged along the steam line and a second intercept valve arranged along the air line, said first and second intercept valves each having a closed state and an open state, wherein the source of liquid milk comprises a reservoir of concentrated milk, which is conveyed to a connector in which mixing of a predetermined quantity of concentrated milk with water from a source is performed so as to form cold diluted milk, the cold diluted milk being propelled by the milk pump along the milk line as far as the frothing device; and said pump arranged along the milk line and said first and second intercept valves are operable independently of each other such that the milk line, the steam line, and the air line are connected to said internal chamber of the frothing device one at a time or in combination with each other depending on the closed and open state of each of the respective first and second intercept valves and on the operation of said pump.

2. The apparatus according to claim 1, wherein said source of liquid milk comprises a dilution connector, a pump for supplying a predetermined quantity of concentrated milk to said dilution connector, a water line between said dilution connector and a cold water source, and a valve arranged along said water line for supplying a predetermined amount of cold water to the said dilution connector in relation to the quantity of concentrated milk present in said dilution connector.

* * * * *